United States Patent
Paulus

(10) Patent No.: US 9,048,963 B1
(45) Date of Patent: Jun. 2, 2015

(54) CONVEYING INFORMATION USING AN AUDIO SIGNAL

(75) Inventor: Wolfgang Paulus, Ramona, CA (US)

(73) Assignee: INTUIT INC., Mountain View, CA (US)

( * ) Notice: Subject to any disclaimer, the term of this patent is extended or adjusted under 35 U.S.C. 154(b) by 455 days.

(21) Appl. No.: 13/551,438

(22) Filed: Jul. 17, 2012

(51) Int. Cl.
*G06F 17/00* (2006.01)
*H04H 60/58* (2008.01)
*H04H 60/64* (2008.01)
*G10L 19/018* (2013.01)
*H04H 60/48* (2008.01)

(52) U.S. Cl.
CPC .............. *H04H 60/58* (2013.01); *G10L 19/018* (2013.01); *H04H 60/64* (2013.01); *H04H 60/48* (2013.01)

(58) Field of Classification Search
CPC ....... H04H 60/48; H04H 60/58; H04H 60/78; H04H 60/64; H04H 60/65; H04H 60/66; G06F 17/30861; G06F 17/30876; G06F 17/30026; G06F 17/30038; G10L 19/018
USPC .......................................................... 700/94
See application file for complete search history.

(56) References Cited

U.S. PATENT DOCUMENTS

| | | | | |
|---|---|---|---|---|
| 2006/0288374 | A1* | 12/2006 | Ferris et al. | 725/62 |
| 2010/0280641 | A1* | 11/2010 | Harkness et al. | 700/94 |
| 2011/0028160 | A1* | 2/2011 | Roeding et al. | 455/456.1 |
| 2013/0259297 | A1* | 10/2013 | Knudson | 382/103 |

* cited by examiner

*Primary Examiner* — Jesse Elbin
(74) *Attorney, Agent, or Firm* — Park, Vaughan, Fleming & Dowler LLP; Steven E. Stupp

(57) ABSTRACT

During a communication technique, an electronic device receives an audio signal from a remote electronic device, such as another electronic device that is proximate to the electronic device. This audio signal may include information that specifies an identifier. The electronic device may analyze the audio signal to extract the identifier, and may provide the identifier to a pre-defined location via a network, such as a web page on the Internet. In response to providing the identifier, the electronic device receives the operation from the pre-defined location via the network. For example, the operation may include an instruction to open a document (such as a web page) on the network.

21 Claims, 4 Drawing Sheets

US 9,048,963 B1

CONVEYING INFORMATION USING AN AUDIO SIGNAL

FIELD

The present disclosure relates to a technique for conveying information to an electronic device using an audio signal.

SUMMARY

The disclosed embodiments relate to a technique for communicating an operation to an electronic device. During this technique, the electronic device receives an audio signal using an audio sensor that receives sound, where the audio signal is received from a remote electronic device and includes information specifying an identifier. Next, the electronic device analyzes the audio signal to extract the identifier, and provides the identifier to a pre-defined location via a network. In response to providing the identifier, the electronic device receives the operation from the pre-defined location via the network.

In some embodiments, prior to receiving the audio signal, the electronic device determines that the remote electronic device is proximate to the electronic device. For example, the determining operation may involve: optical communication, near-field communication, and/or radio-frequency communication. Alternatively or additionally, the determining operation may involve using information provided by a positioning system.

In some embodiments, prior to the receiving, the electronic device communicates additional information to the remote electronic device that indicates that the electronic device is proximate to the remote electronic device. Alternatively or additionally, the electronic device may provide an instruction to a user of the electronic device to perform a gesture using the electronic device to indicate that the electronic device is proximate to the remote electronic device.

Note that the information included in the audio signal may be encoded using a technique other than temporal amplitude modulation. Moreover, the information included in the audio signal may be conveyed using frequencies outside of human auditory frequencies.

Furthermore, the aforementioned operations may be performed without an explicit action by a user of the electronic device.

In some embodiments, the identifier includes a Universal Unique Identifier and/or a Quick Response code. Additionally, the pre-defined location may include a web page and the network may include the Internet.

Moreover, the operation may be dynamically modified after a time interval has elapsed.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for receiving an operation to be performed by the electronic device, and a computer-program product (e.g., software) for use with the electronic device are described. During this communication technique, the electronic device receives an audio signal from a remote electronic device, such as another electronic device that is proximate to the electronic device. This audio signal may include information that specifies an identifier. The electronic device may analyze the audio signal to extract the identifier, and may provide the identifier to a pre-defined location via a network, such as a web page on the Internet. In response to providing the identifier, the electronic device receives the operation from the pre-defined location via the network. For example, the operation may include an instruction to open a document (such as a web page) on the network.

In this way, the communication technique may convey information to the electronic device using sound. For example, the identifier may include information such as a Universal Unique Identifier and/or a Quick Response code. However, by using sound to convey the information, the communication technique may avoid the problems that are sometimes encountered when capturing an image of a Quick Response code, such as: image-sensor displacement while capturing the image, difficulty focusing, poor lighting conditions, a partially obscured Quick Response code, and/or a reflective or damaged Quick Response code. Therefore, the communication technique may be less cumbersome or time-consuming for a user, which may make it more likely that the user receives the information and/or is receptive to a message included with the information. As a consequence, the communication technique may increase the effectiveness of advertising and other messages that are 'pushed' to users of electronic devices.

In the discussion that follows, the user may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
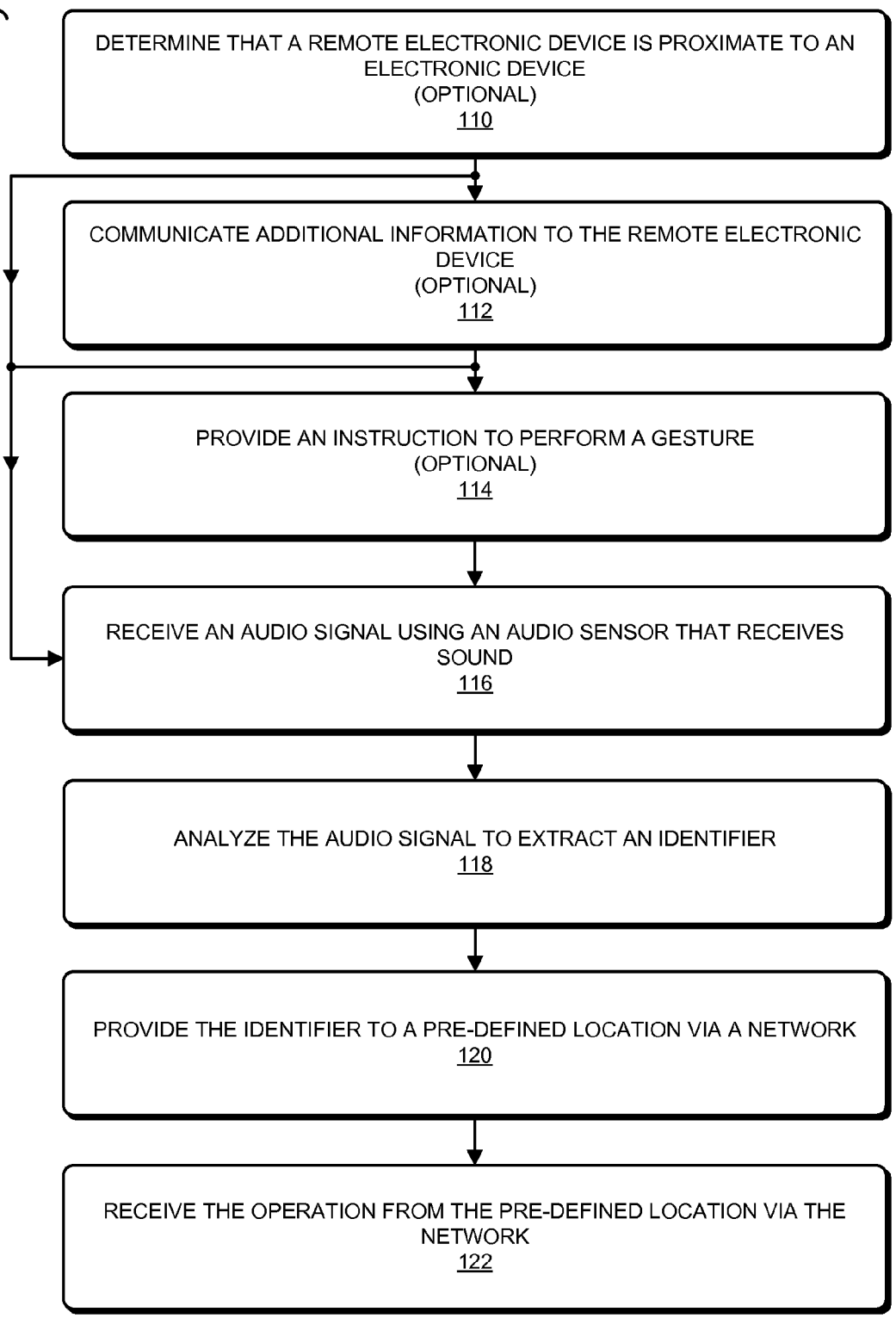
FIG. 1 is a flow chart illustrating a method for receiving an operation to be performed by an electronic device in accordance with an embodiment of the present disclosure.
Figure 4:
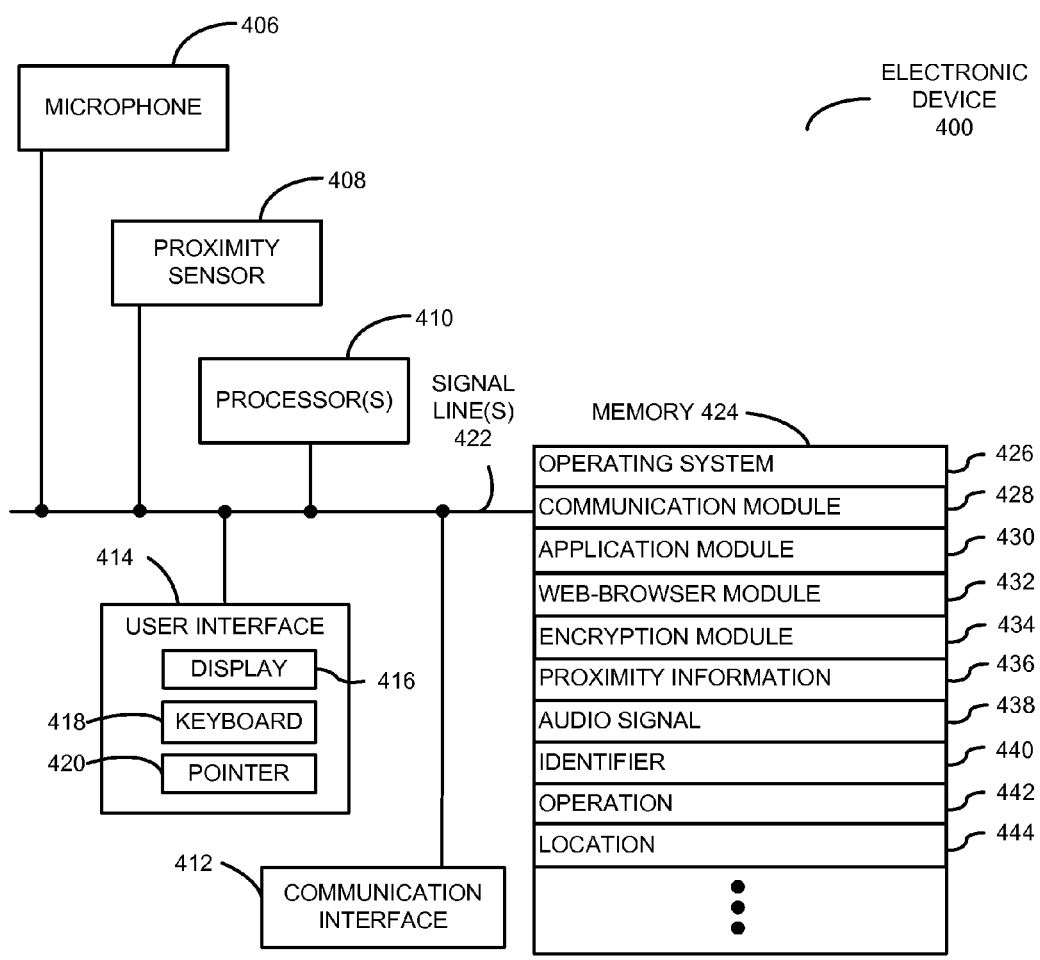
FIG. 4 is a block diagram illustrating an electronic device that performs the method of FIGS. 1 and 2 in accordance with an embodiment of the present disclosure.

We now describe embodiments of the communication technique. FIG. 1 presents a flow chart illustrating a method 100 for receiving an operation to be performed by an electronic device, such as electronic device 400 (FIG. 4). During operation, the electronic device receives an audio signal using an audio sensor (such as a microphone) that receives sound (operation 116), where the audio signal is received from a remote electronic device and includes information specifying an identifier.

Note that the information included in the audio signal may be encoded using a technique other than temporal amplitude modulation (i.e., it may be encoded using a technique other than that used to encode speech). Moreover, the information included in the audio signal may be conveyed using frequencies outside of human auditory frequencies. In some embodiments, the identifier includes a Universal Unique Identifier and/or a Quick Response code.

Then, the electronic device analyzes the audio signal to extract the identifier (operation 118). For example, the analysis may involve a fast Fourier Transform technique.

Moreover, the electronic device provides the identifier to a pre-defined location via a network (operation 120). For example, the pre-defined location may include a web page or a web address (such as that of a server that hosts the web page), and the network may include the Internet.

In response to providing the identifier, the electronic device receives the operation (or information that specifies the operation) from the pre-defined location via the network (operation 122). This operation may be dynamically modified after a time interval has elapsed. For example, there may be a timestamp associated with the operation, and after the time interval has elapsed (based on the timestamp) the operation may be changed.

In some embodiments, prior to the receiving (operation 116), the electronic device optionally determines that the remote electronic device is proximate to the electronic device (operation 110). For example, the optional determining (operation 110) may involve: optical communication, near-field communication, and/or radio-frequency communication. Alternatively or additionally, the optional determining (operation 110) may involve using information provided by a positioning system.

In some embodiments, prior to the receiving (operation 116), the electronic device optionally communicates additional information to the remote electronic device (operation 112) that indicates that the electronic device is proximate to the remote electronic device. Alternatively or additionally, the electronic device may optionally provide an instruction (to a user of the electronic device) to perform a gesture (operation 114) using the electronic device to indicate that the electronic device is proximate to the remote electronic device. For example, the gesture may include: moving the electronic device up and down, left or right, in a circular motion, and/or in an arc.

Note that the operations in method 100 may be performed without an explicit action by a user of the electronic device.

Figure 2:
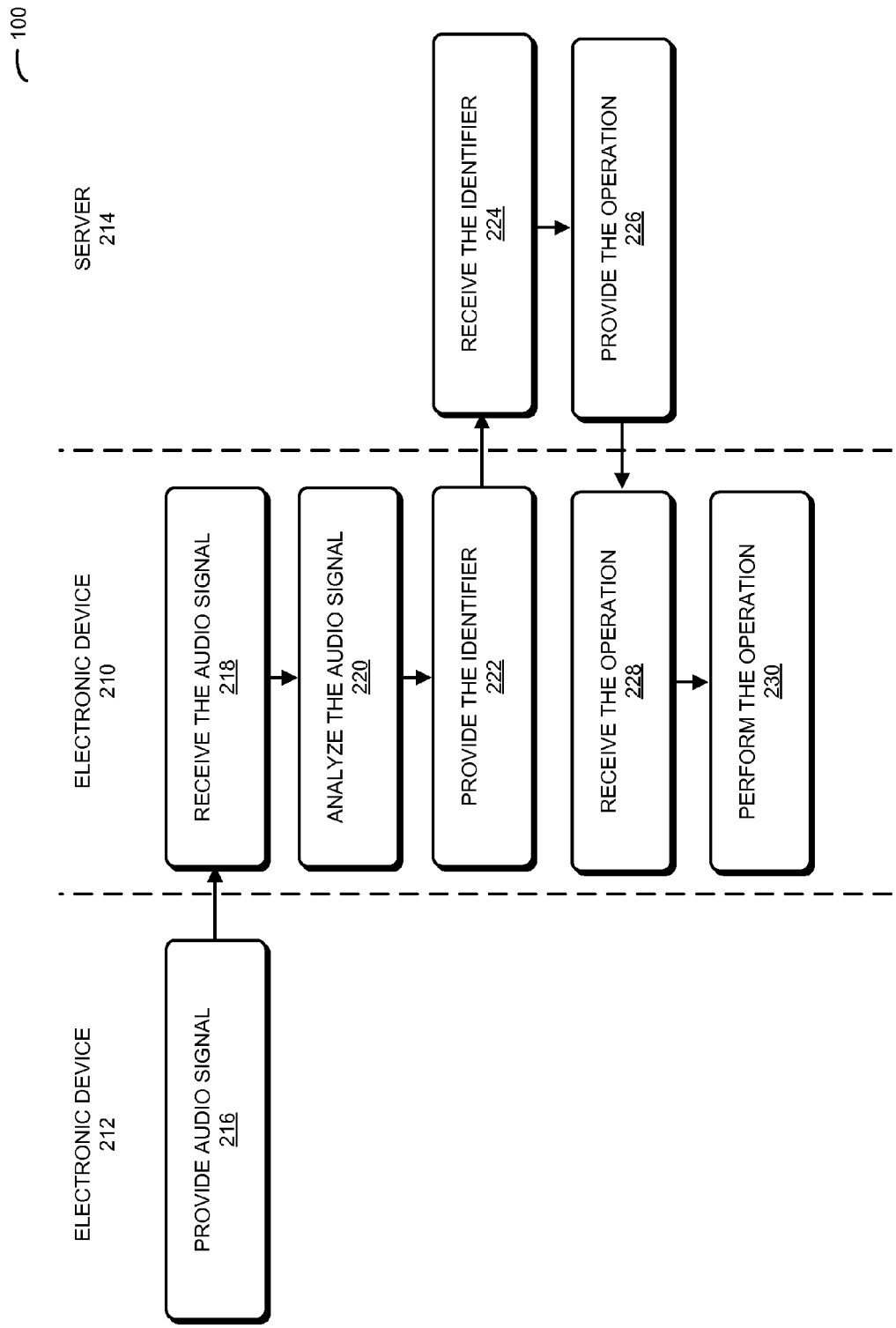
FIG. 2 is a flow chart illustrating the method of FIG. 1 in accordance with an embodiment of the present disclosure.

In an exemplary embodiment, the communication technique may be implemented using electronic devices, computers and/or servers, which may communicate through a network, such as a cellular-telephone network and/or the Internet (e.g., using a client-server architecture). This is illustrated in FIG. 2, which presents a flow chart illustrating method 100. During this method, electronic device 212 provides (operation 216) and electronic device 210 receives the audio signal (operation 218). This audio signal includes the information specifying the identifier. Moreover, as noted previously, operations 216 and 218 may occur when electronic devices 210 and 212 are proximate to each other.

Then, electronic device 210 analyzes the audio signal (operation 220) to extract the identifier, and provides the identifier (operation 222) to a pre-defined location via a network. For example, the pre-defined location may include a web page and the network may include the Internet. Thus, the identifier may be received (operation 224) by server 214. In response, server 214 may provide the operation (operation 226), such as information that includes or specifies the operation.

After receiving the operation (operation 228), electronic device 210 may perform the operation (operation 230). For example, electronic device 210 may open a Web browser, and the Web browser may perform the operation, such as opening a web page at a location on the network.

In some embodiments of method 100 (FIG. 1), there may be additional or fewer operations. Moreover, the order of the operations may be changed, and/or two or more operations may be combined into a single operation.

In an exemplary embodiment, instead of using an image to convey information, the audio signal is used. In particular, when electronic devices 210 and 212 are proximate to each other (such as when they are within 1-4 inches of each other), electronic device 212 may briefly broadcast the audio signal. Note that proximity may be determined by either or both of electronic devices 210 and 212 using a light sensor, near-field communication between electronic devices 210 and 212, etc. In addition, note that the audio signal may be outside of human auditory frequencies, such as greater than 20 kHz and/or less than 50-100 Hz.

For example, electronic device 212 may be a stationary box in a retail establishment (such as a supermarket) that chirps the audio signal to nearby or proximate electronic devices. This audio signal may include one piece of information, a token or an identifier, such as a 24-digit Universal Unique Identifier. This identifier may be unique to electronic device 212.

After receiving the audio signal, electronic device 210 may decode the encoded audio signal to obtain the identifier. This decoding may use a fast Fourier Transform technique. For example, the decoded identifier may include a location that is subsequently provided by electronic device 210 to a Web service. In response, the Web service may map the identifier to an information record (such as a location, e.g. a web-page address) and provides a corresponding instruction or an operation to electronic device 210. When executed by electronic device 210, this operation may open the web page on a Web browser with the information.

Because the decoded identifier is interpreted by the Web service, these 'sound tags' (i.e., the electronic device 212) can be centrally repurposed. In particular, while the identifier provided by electronic device 212 may remain unchanged, the instructions or the operation provided to electronic device 210 by server 214 may be modified (for example, by changing the mapping from the identifier to the operation or the instruction). In addition, note that all the information needed to specify the operation may not be included in the audio signal or the identifier. Instead, it may be subsequently received from the Web service (and, more generally, via server 214 on a network such as the Internet).

Thus, when in proximity to electronic device 212, electronic device 210 (for example, an application executing on electronic device 210) may: enable a microphone on electronic device 210, receive the audio signal, decode the identifier, and access the Web service. Note that electronic device 210 may not need an image sensor or camera or a Quick Response code decoder in the communication technique.

As an illustration, electronic device 212 may be used to provide an identifier that specifies: technical support for a product (such as a printer); or marketing information associated with a product that is near electronic device 212 (for example, on a store shelf). In some embodiments, a customer shopping in a store may interact with electronic devices, such as electronic device 212, and may collect identifiers instead of actual products. Then, the customer can go to a checkout or point-of-sale terminal and purchase the products, which may be provided to the customer at the point-of-sale terminal or which may be shipped to the customer's delivery address (such as their home).

In some embodiments, the operation or instruction may be varied dynamically based on a date and/or time. Thus, as part of a promotion, a discount may be offered via the operation or instruction. If a customer makes a purchase within a time interval, they may receive a credit or a coupon. However, if the customer makes a purchase after the time interval, the credit or coupon may be different.

Figure 3:
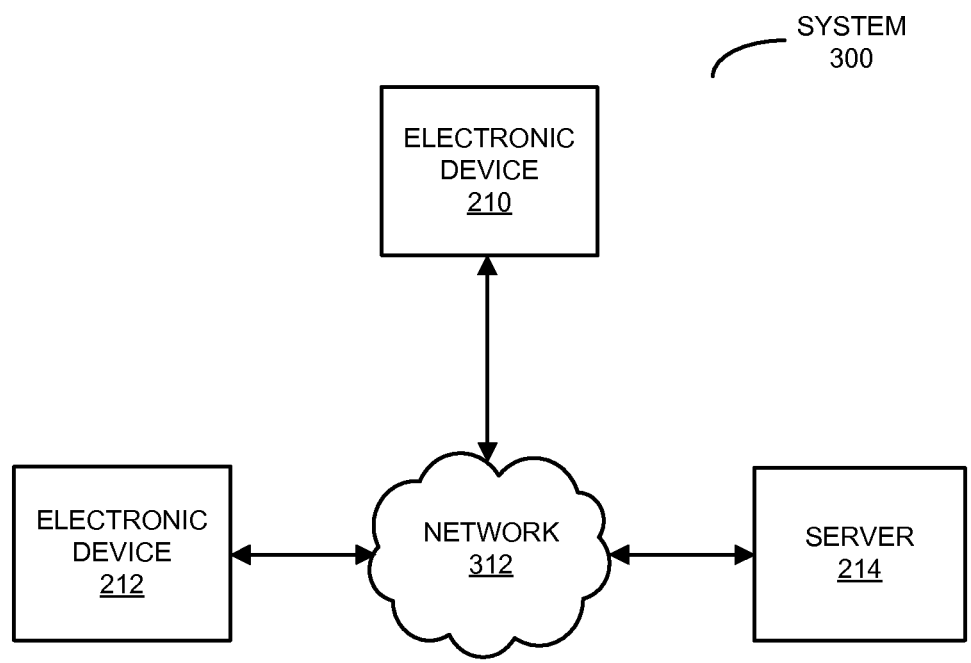
FIG. 3 is a block diagram illustrating a system that performs the method of FIGS. 1 and 2 in accordance with an embodiment of the present disclosure.

We now describe embodiments of the system and the electronic device, and their use. FIG. 3 presents a block diagram illustrating a system 300 that performs method 100 (FIGS. 1 and 2). In this system, a user of electronic device 210 may use a software product, such as a software application that is resident on and that executes on electronic device 210. (Alternatively, the user may interact with a web page that is provided by server 214 via network 312, and which is rendered by a web browser on electronic device 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on electronic device 210 (such as a software application that is provided by server 214 or that is installed and which executes on electronic device 210).

In particular, the user may bring electronic device 210 proximate to electronic device 212. This proximity may be detected by either or both of electronic devices 210 and 212. In response, the software application may enable a microphone on electronic device 210 and electronic device 212 may broadcast the audio signal. Then, the software application may receive the audio signal from the microphone. Moreover the software application may decode the audio signal to obtain the identifier.

Next, the software application may provide the identifier to server 214 (which hosts the Web service) via network 312. Server 214 may map the identifier to a corresponding operation or instruction, and may provide this operation or instruction to electronic device 210 via network 312. Moreover, the software application may execute the operation or may perform the instruction. For example, the software application may launch a Web browser that executes the operation or performs the instruction, such as accessing a web page (and, more generally, a location) via network 312. This web page may be hosted by server 214.

Note that information in system 300 may be stored at one or more locations in system 300 (i.e., locally or remotely). Moreover, because this data may be sensitive in nature, it may be encrypted. For example, stored data and/or data communicated via network 312 may be encrypted.

FIG. 4 presents a block diagram illustrating an electronic device 400 that performs method 100 (FIGS. 1 and 2), such as electronic device 210 (FIGS. 2 and 3). Electronic device 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in electronic device 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to electronic device 400.

Memory 424 may also include multiple program modules (or sets of instructions), including: application module 430 (or a set of instructions), Web-browser module 432 (or a set of instructions) and/or encryption module 434 (or a set of instructions). Note that one or more of these program modules (or sets of instructions) may constitute a computer-program mechanism.

During method 100 (FIGS. 1 and 2), a user of electronic device 400 may bring it proximate to another electronic device (such as electronic device 212 in FIGS. 2 and 3). Application module 430 may receive proximity information 436 using proximity sensor 408 (such as a photo-diode). In response, application module 430 may enable a microphone 406 on electronic device 400. Then, application module 430 may receive audio signal 438 from microphone 406, and may decode audio signal 438 to obtain identifier 440.

Next, application module 430 may provide identifier 440 to server 214 (FIGS. 2 and 3) using communication module 428 and communication interface 412. Subsequently, application module 430 may receive a corresponding operation 442 (or instruction) from server 214 (FIGS. 2 and 3) using communication interface 412 and communication module 428. Furthermore, application module 430 may launch Web-browser module 432, and Web-browser module 432 may execute operation 442, such as accessing a location 444 (such as a web page) using communication module 428 and communication interface 412.

Because information in electronic device 400 may be sensitive in nature, in some embodiments at least some of the data stored in memory 424 and/or at least some of the data communicated using communication module 428 is encrypted using encryption module 434.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although electronic device 400 is illustrated as having a number of discrete items, FIG. 4 is intended to be a functional description of the various features that may be present in electronic device 400 rather than a structural schematic of the embodiments described herein. In some embodiments, some or all of the functionality of electronic device 400 may be implemented in one or more application-specific integrated circuits (ASICs) and/or one or more digital signal processors (DSPs).

Electronic device 400, as well as computers and servers in system 300 (FIG. 3), may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 312 (FIG. 3)

may include: the Internet, World Wide Web (WWW), an intranet, a cellular-telephone network, LAN, WAN, MAN, or a combination of networks, or other technology enabling communication between computing systems.

Electronic device 210 (FIGS. 2 and 3), electronic device 212 (FIGS. 2 and 3), system 300 (FIG. 3), and/or electronic device 400 (FIG. 4) may include fewer components or additional components. Moreover, two or more components may be combined into a single component, and/or a position of one or more components may be changed. In some embodiments, the functionality of electronic device 210 (FIGS. 2 and 3), electronic device 212 (FIGS. 2 and 3), system 300 (FIG. 3) and/or electronic device 400 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method comprising:
    at the electronic device, receiving a set of audio signals using an audio sensor configured to receive sound, wherein each audio signal in the set of audio signals is received from a different remote electronic device in a set of remote electronic devices at a retail establishment, and wherein each audio signal in the set of audio signals includes information specifying an identifier that identifies a different product in a set of products that are sold at the retail establishment;
    for each audio signal in the set of audio signals:
        using the electronic device, analyzing the audio signal to extract the identifier specified by the information included with the audio signal; and
        providing the identifier specified by the information included with the audio signal to a pre-defined location via a network; and
    purchasing the set of products by providing payment for the set of products at the retail establishment, wherein the retail establishment determines an amount for the payment by using the identifiers provided to the pre-defined location.

2. The method of claim 1, wherein, prior to the receiving, the method further comprises determining that the device is proximate to the retail establishment.

3. The method of claim 2, wherein the determining operation involves a communication technique selected from the group consisting of: optical communication, near-field communication, and radio-frequency communication.

4. The method of claim 2, wherein the determining operation involves using information provided by a positioning system.

5. The method of claim 1, wherein, prior to the receiving, the method further comprises communicating additional information to at least one of the remote electronic devices that indicates that the electronic device is proximate to the at least one of the remote electronic devices.

6. The method of claim 1, wherein, prior to the receiving, the method further comprises providing an instruction to perform a gesture using the electronic device to indicate that the electronic device is proximate to the retail establishment.

7. The method of claim 1, wherein the information included in at least one of the audio signals is encoded using a technique other than temporal amplitude modulation.

8. The method of claim 1, wherein the information included in at least one of the audio signals is conveyed using frequencies outside of human auditory frequencies.

9. The method of claim 1, wherein the operations in the method are performed without an explicit action by a user of the electronic device.

10. The method of claim 1, wherein the identifier includes a Universal Unique Identifier.

11. The method of claim 1, wherein the identifier corresponds to a Quick Response code.

12. The method of claim 1, wherein the pre-defined location includes a web page and the network includes the Internet.

13. The method of claim 1, wherein the operation is dynamically modified after a time interval has elapsed.

14. The method of claim 1, further comprising:
    for each remote electronic device in the set of remote electronic devices:
        associating the remote electronic device with a given product in the set of products by configuring the remote electronic device to transmit the audio signal that includes the information specifying the identifier that identifies the given product, wherein the identifier that identifies the given product is different from identifiers for other products in the set of products, and wherein the audio signal transmitted by the remote electronic device is different from audio signals transmitted by the other remote electronic devices in the set of remote electronic devices;
        upon determining that the electronic device is proximate to the remote electronic device, using the remote electronic device to transmit the audio signal that includes the information specifying the identifier that identifies the given product;
        receiving, from the electronic device, a given identifier, wherein the given identifier is the identifier provided to the pre-defined location that identifies the given product;
        using the given identifier to determine a price for the given product; and
        adding the price for the given product to the amount for the payment.

15. The method of claim 1, wherein the set of products are purchased by a user of the electronic device, and wherein, while at the retail establishment and before purchasing the set of products, the user collects the identifiers for the set of products without collecting the products.

16. A computer-program product for use in conjunction with an electronic device, the computer-program product comprising a non-transitory computer-readable storage medium and a computer-program mechanism embedded therein, to receive an operation to be performed by the electronic device, the computer-program mechanism including:

instructions for receiving, at the electronic device, a set of audio signals using an audio sensor configured to receive sound, wherein each audio signal in the set of audio signals is received from a different remote electronic device in a set of remote electronic devices at a retail establishment, and wherein each audio signal in the set of audio signals includes information specifying an identifier that identifies a different product in a set of products that are sold at the retail establishment;

instructions for, for each audio signal in the set of audio signals:

using the electronic device, analyzing the audio signal to extract the identifier specified by the information included with the audio signal; and providing the identifier specified by the information included with the audio signal to a pre-defined location via a network; and instructions for purchasing the set of products by providing payment for the set of products at the retail establishment, wherein the retail establishment determines an amount for the payment by using the identifiers provided to the pre-defined location.

17. The computer-program product of claim 16, wherein the computer-program mechanism further includes instructions for one of: determining that the device is proximate to the retail establishment; and communicating additional information to at least one of the remote electronic devices that indicates that the electronic device is proximate to the at least one of the remote electronic devices.

18. The computer-program product of claim 16, wherein the information included in the audio signal is encoded using a technique other than temporal amplitude modulation.

19. The computer-program product of claim 16, wherein the information included in the audio signal is conveyed using frequencies outside of human auditory frequencies.

20. The computer-program product of claim 16, wherein the instructions are performed without an explicit action by a user of the electronic device.

21. An electronic device, comprising:

a processor;

memory; and a program module, wherein the program module is stored in the memory and configurable to be executed by the processor to receive an operation to be performed by the electronic device, the program module including:

instructions for receiving, at the electronic device, a set of audio signals using an audio sensor configured to receive sound, wherein each audio signal in the set of audio signals is received from a different remote electronic device in a set of remote electronic devices at a retail establishment, and wherein each audio signal in the set of audio signals includes information specifying an identifier that identifies a different product in a set of products that are sold at the retail establishment;

instructions for, for each audio signal in the set of audio signals:

using the electronic device, analyzing the audio signal to extract the identifier specified by the information included with the audio signal; and providing the identifier specified by the information included with the audio signal to a pre-defined location via a network; and instructions for purchasing the set of products by providing payment for the set of products at the retail establishment, wherein the retail establishment determines an amount for the payment by using the identifiers provided to the pre-defined location.

* * * * *